(12) United States Patent
Charles et al.

(10) Patent No.: US 7,682,592 B2
(45) Date of Patent: Mar. 23, 2010

(54) CHEMICAL PROCESS AND PRODUCTION UNIT

(75) Inventors: Gary Charles, Marietta, GA (US); Daniel D. Olson, Woodstock, GA (US); Patrick S. Bryant, Woodstock, GA (US)

(73) Assignee: AKZO Nobel N.V., Arnhem (NL)

( * ) Notice: Subject to any disclaimer, the term of this patent is extended or adjusted under 35 U.S.C. 154(b) by 179 days.

(21) Appl. No.: 11/281,890

(22) Filed: Nov. 18, 2005

(65) Prior Publication Data

US 2006/0133983 A1 Jun. 22, 2006

Related U.S. Application Data

(60) Provisional application No. 60/633,130, filed on Dec. 6, 2004.

(30) Foreign Application Priority Data

Jan. 12, 2005 (EP) .................................. 05100143

(51) Int. Cl.
*C01B 11/02* (2006.01)
(52) U.S. Cl. ........................ 423/478; 423/477
(58) Field of Classification Search ................ 423/478, 423/477
See application file for complete search history.

(56) References Cited

U.S. PATENT DOCUMENTS

| | | | |
|---|---|---|---|
| 2,833,624 A | | 5/1958 | Sprauer |
| 3,784,367 A | * | 1/1974 | Moore ........................ 71/36 |
| 3,816,077 A | * | 6/1974 | Fuller et al. ................ 422/189 |
| 4,101,636 A | * | 7/1978 | Larson et al. ............... 423/305 |
| 4,534,952 A | | 8/1985 | Rapson et al. |
| 4,574,084 A | * | 3/1986 | Berger ........................ 424/601 |
| 4,744,956 A | | 5/1988 | Yant et al. |
| 5,091,166 A | | 2/1992 | Engstrom et al. |
| 5,091,167 A | | 2/1992 | Engstrom et al. |
| 5,376,350 A | | 12/1994 | Tenny et al. |
| 5,895,638 A | | 4/1999 | Tenny |

(Continued)

FOREIGN PATENT DOCUMENTS

CL 0258-1994 2/1993

(Continued)

*Primary Examiner*—Ngoc-Yen M Nguyen
(74) *Attorney, Agent, or Firm*—Robert C. Morriss; David J. Serbin

(57) ABSTRACT

The invention relates to a continuous process for producing chlorine dioxide comprising the steps of continuously:
a) feeding to a reactor (1) an acid, hydrogen peroxide and alkali metal chlorate;
b) reacting the alkali metal chlorate with the acid and the hydrogen peroxide to form a product stream (2) containing chlorine dioxide, oxygen and alkali metal salt of the acid,
c) bringing the product stream from the reactor to an eductor (3) and mixing it with motive water fed to the eductor and thereby forming a diluted product stream;
d) removing oxygen from the diluted product stream;
e) withdrawing part of the diluted product stream (9), before, during or after the step of removing oxygen;
f) adding water (11) to the non-withdrawn part of the diluted product stream to form a recycle stream (12); and,
g) bringing the recycle stream (12) to the eductor and feeding it thereto as motive water (4).

The invention further relates to a production unit for the production of an aqueous solution comprising chlorine dioxide.

19 Claims, 1 Drawing Sheet

U.S. PATENT DOCUMENTS

| | | |
|---|---|---|
| 6,387,344 B1 | 5/2002 | Tenny et al. |
| 6,790,427 B2 | 9/2004 | Charles et al. |
| 2003/0007899 A1* | 1/2003 | Charles et al. .............. 422/129 |
| 2003/0031621 A1 | 2/2003 | Gravitt et al. |
| 2004/0101438 A1* | 5/2004 | Nelson et al. ................. 422/31 |
| 2004/0175322 A1 | 9/2004 | Woodruff et al. |
| 2004/0231977 A1* | 11/2004 | Roselle et al. .............. 204/242 |
| 2005/0186131 A1 | 8/2005 | Charles |

FOREIGN PATENT DOCUMENTS

| | | |
|---|---|---|
| CL | 3164-2005 | 12/2004 |
| EP | 0612 686 B1 | 8/1994 |
| EP | 0612686 A2 | 8/1994 |
| WO | WO 2006/062455 A1 | 6/2006 |

* cited by examiner

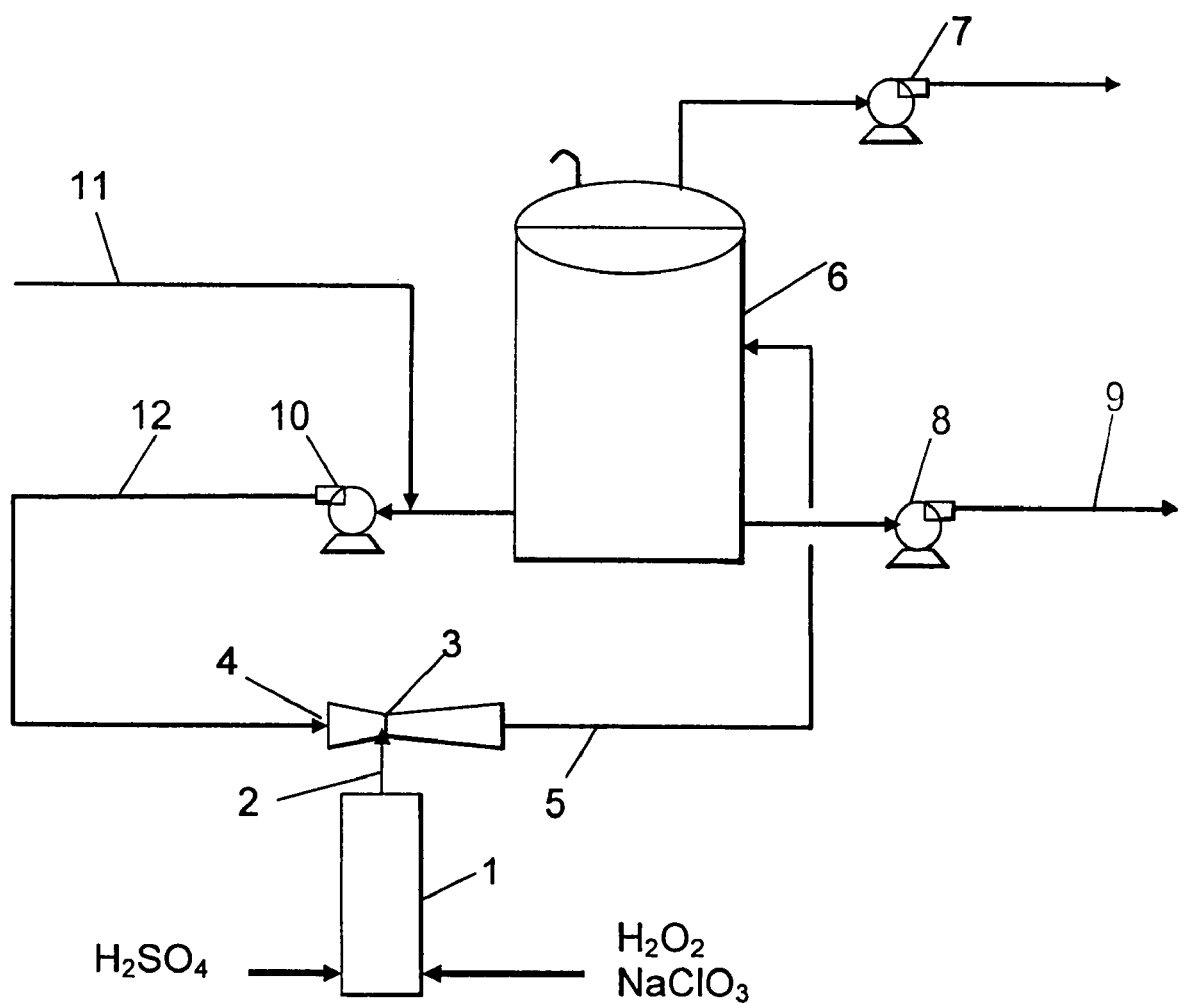

CHEMICAL PROCESS AND PRODUCTION UNIT

This application claims priority from U.S. Provisional Application No. 60/633,130, filed on Dec. 6, 2004, and European Patent Application No. 05100143.6, filed on Jan. 12, 2005, the subject matter of which is incorporated herein by reference.

The present invention relates to a process and a production unit for the production of an aqueous solution comprising chlorine dioxide.

Chlorine dioxide is used in various applications such as pulp bleaching, fat bleaching, water purification and removal of organic materials from industrial wastes. Since chlorine dioxide is not storage stable, it is generally produced on-site.

In large scale processes chlorine dioxide is usually produced by reacting alkali metal chlorate with a reducing agent in an aqueous reaction medium. Chlorine dioxide may be withdrawn from the reaction medium as a gas, as in the processes described in e.g. U.S. Pat. Nos. 5,091,166, 5,091,167 and EP patent 612686. Normally, the chlorine dioxide gas is then absorbed into water to form an aqueous solution thereof. These large-scale processes are very efficient but require extensive process equipment and instrumentation.

For the production of chlorine dioxide in small-scale units, such as for water purification applications or small bleaching plants, it is favourable not to separate chlorine dioxide from the reaction medium but to withdraw a chlorine dioxide containing solution directly from the reactor, optionally after dilution with water. Such processes have in recent years become commercial and are described in e.g. U.S. Pat. Nos. 2,833,624, 4,534,952, 5,895,638, 6,387,344, 6,790,427 and in US patent applications Publ. No. 2004/0175322 and Publ. No. 2003/0031621. The required process equipment and instrumentation are considerably less extensive than in the large-scale processes described above. However, there is still a need for further improvements.

In the processes based on alkali metal chlorate where a chlorine dioxide containing solution is withdrawn directly from the reactor, it has been difficult to obtain solutions with such a high concentration of chlorine dioxide as desired for many applications, like recycle paper bleaching, bagasse bleaching, or small-scale pulp bleaching.

It is an object of the invention to provide a simple process enabling direct production of chlorine dioxide in an aqueous solution of high concentrations.

It is another object of the invention to provide a production unit for performing the process.

It has surprisingly been found possible to meet these objects by providing a continuous process for producing chlorine dioxide comprising the steps of continuously:
a) feeding to a reactor an acid, hydrogen peroxide and alkali metal chlorate;
b) reacting the alkali metal chlorate with the acid and the hydrogen peroxide to form a product stream containing chlorine dioxide, oxygen and alkali metal salt of the acid,
c) bringing the product stream from the reactor to an eductor and mixing it with motive water fed to the eductor and thereby forming a diluted product stream;
d) removing oxygen from the diluted product stream;
e) withdrawing part of the diluted product stream, before, during or after the step of removing oxygen;
f) adding water to the non-withdrawn part of the diluted product stream to form a recycle stream; and,
g) bringing the recycle stream to the eductor and feeding it thereto as motive water.

The reactor and the eductor can be operated as described in the earlier mentioned documents U.S. Pat. Nos. 2,833,624, 4,534,952, 5,895,638, 6,387,344, 6,790,427 and US patent application Publ. No. 2004/0175322 and Publ. No. 2003/0031621, which hereby are incorporated as references.

The alkali metal chlorate is suitably fed to the reactor as an aqueous solution. The alkali metal may, for example, be sodium, potassium or mixtures thereof, of which sodium is most preferred. The acid is preferably a mineral acid such as sulfuric acid, hydrochloric acid, nitric acid, perchloric acid or mixtures thereof, of which sulfuric acid is most preferred. The molar ratio $H_2O_2$ to $ClO_3^-$ fed to the reactor is suitably from about 0.2:1 to about 2:1, preferably from about 0.5:1 to about 1.5:1, most preferably from about 0.5:1 to about 1:1. Alkali metal chlorate always contains some chloride as an impurity, but it is fully possible also to feed more chloride to the reactor, such as metal chloride or hydrochloric acid. However, in order to minimize the formation of chlorine it is preferred to keep the amount of chloride ions fed to the reactor low, suitably below about 1 mole %, preferably below about 0.1 mole %, more preferably less than about 0.05 mole %, most preferably less than about 0.02 mole % $Cl^-$ of the $ClO_3^-$ (including chloride as an impurity in the chlorate and optionally extra added chloride).

In the case sulfuric acid is used as a feed to the reactor, it preferably has a concentration from about 60 to about 98 wt %, most preferably from about 70 to about 85 wt % and preferably a temperature from about 0 to about 80° C., most preferably from about 20 to about 60° C. Preferably from about 2 to about 7 kg $H_2SO_4$, most preferably from about 3 to about 5 kg $H_2SO_4$ is fed per kg $ClO_2$ produced. In order to use sulphuric acid of high concentration, a dilution and cooling scheme as described in US patent application Publ. No. 2004/0175322 is preferably applied.

In a particularly preferred embodiment alkali metal chlorate and hydrogen peroxide is fed to the reactor in the form of a premixed aqueous solution, for example a composition as described in U.S. Pat. No. 6,387,344. Such a composition may be an aqueous solution comprising from about 1 to about 6.5 moles/litre, preferably from about 3 to about 6 moles/litre of alkali metal chlorate, from about 1 to about 7 moles/litre, preferably from about 3 to about 5 moles/litre of hydrogen peroxide and at least one of a protective colloid, a radical scavenger or a phosphonic acid based complexing agent, wherein the pH of the aqueous solution suitably is from about 0.5 to about 4, preferably from about 1 to about 3.5, most preferably from about 1.5 to about 3. Preferably, at least one phosphonic acid based complexing agent is present, preferably in an amount from about 0.1 to about 5 mmoles/litre, most preferably from about 0.5 to about 3 mmoles/litre. If a protective colloid is present, its concentration is preferably from about 0.001 to about 0.5 moles/litre, most preferably from about 0.02 to about 0.05 moles/litre. If a radical scavenger is present, its concentration is preferably from about 0.01 to about 1 moles/litre, most preferably from about 0.02 to about 0.2 moles/litre. Particularly preferred compositions comprise at least one phosphonic acid based complexing agent selected from the group consisting of 1-hydroxyethylidene-1,1-diphosphonic acid, 1-aminoethane-1,1-diphosphonic acid, aminotri (methylenephosphonic acid), ethylene diamine tetra (methylenephosphonic acid), hexamethylene diamine tetra (methylenephosphonic acid), diethylenetriamine penta (methylenephosphonic acid), diethylenetriamine hexa (methylenephosphonic acid), 1-aminoalkane-1,1-diphosphonic acids (such as morpholinomethane diphosphonic acid, N,N-dimethyl aminodimethyl diphosphonic acid, aminomethyl diphosphonic acid), reaction products and salts thereof, preferably sodium salts. Useful protective colloids include tin compounds, such as alkali metal stannate, particularly sodium stannate (Na2(Sn(OH)6). Useful radical scavengers include pyridine carboxylic acids, such as 2,6-pyridine dicarboxylic acid. Suitably the amount of chloride ions is below about 300 mmoles/litre, preferably below about 50 mmoles/litre, more preferably below about 5 mmoles/litre, most preferably below about 0.5 mmoles/litre.

The temperature in the reactor is suitably maintained below the boiling point of the reactants and the product stream at the prevailing pressure, preferably from about 20 to about 80° C., most preferably from about 30 to about 60° C. The pressure maintained within the reactor is suitably slightly subatmospheric, preferably from about 30 to about 100 kPa absolute, most preferably from about 65 to about 95 kPa absolute.

The reactor may comprise one or several vessels, for example arranged vertically, horizontally or inclined. The reactants may be fed directly to the reactor or via a separate mixing device. Suitably the reactor is a preferably substantially tubular through-flow vessel or pipe, most preferably comprising means for mixing the reactants in a substantially uniform manner. Such means for mixing are described in e.g. U.S. Pat. No. 6,790,427 and US patent application Publ. No. 2004/0175322.

The length (in the main flow direction) of the reactor used is preferably from about 150 to about 1500 mm, most preferably from about 300 to about 900 mm. It has been found favourable to use a substantially tubular reactor with an inner diameter from about 25 to about 300 mm, preferably from about 50 to about 150 mm. It is particularly favourable to use a substantially tubular reactor having a preferred ratio of the length to the inner diameter from about 12:1 to about 1:1, most preferably from about 8:1 to about 4:1. A suitable average residence time in the reactor is in most cases from about 1 to about 60 seconds, preferably from about 3 to about 20 seconds.

The reaction of alkali metal chlorate, acid and hydrogen peroxide results in the formation of a product stream in the reactor, normally comprising both liquid and foam, and containing chlorine dioxide, oxygen, alkali metal salt of the acid and, in most cases, some remaining unreacted feed chemicals. Chlorine dioxide and oxygen may be present both as dissolved in the liquid and as gas bubbles. If sulphuric acid is used the alkali metal salt is a sulphate salt. It has been found possible to achieve a conversion degree of alkali metal chlorate to chlorine dioxide from about 75% to 100%, preferably from about 80 to 100%, most preferably from about 95 to 100%.

The feed chemicals, including acid, alkali metal chlorate and reducing agent, are preferably fed close to one end of the reactor and the product stream is preferably withdrawn at the other end of the reactor.

The product stream withdrawn from the reactor, including any liquid, foam and gas therein, is brought to the eductor, preferably by a suction force created by the eductor. The product stream is then mixed with motive water fed to the eductor to form a diluted product stream. Any kind of eductor may be used, although it is particularly preferred to use an eductor where the motive water is brought to flow in an at least partially spiral or helical manner as described in U.S. Pat. No. 6,79,0427.

The diluted product stream obtained from the eductor still comprises chlorine dioxide, oxygen and alkali metal salt of the acid. At least some of the oxygen should be removed by any suitable means, for example a cyclone separator with an air vent, a large diameter pipe with an air vent valve, a separator with a level control and an automatic vent valve or any other existing means for separating inert gasses like air from liquid streams. In a preferred embodiment the diluted product stream is brought to a vented tank where it is held at a time sufficient for at least some of the oxygen to disengage from the liquid. In order to minimise the loss of chlorine dioxide the temperature in the tank is preferably maintained from about 1 to about 20° C., most preferably from about 4 to about 10° C.

Part of the diluted product stream, preferably from about 10 to about 90%, most preferably from about 20 to about 80%, particularly most preferably from about 30 to about 70%, is withdrawn and constitutes the actual product from the process, i.e. an aqueous solution comprising chlorine dioxide, preferably in a concentration above 4 grams/litre. This may be done before, during or after the removal of oxygen. If oxygen is removed in a vented tank, it is preferred to withdraw from the same tank the part of the diluted product stream that should constitute the actual product.

Water is added to the non-withdrawn part of the diluted product stream to form a recycle stream, preferably in an amount to give a concentration of chlorine dioxide in the recycle stream from about 2 to about 12 grams/litre, most preferably from about 3 to about 6 grams/litre. The added water preferably has a temperature sufficiently low to give a temperature of the recycle stream below about 20° C., preferably below about 15° C., most preferably below about 10° C., particularly most preferably below about 5° C. It is also possible to use other cooling means such as heat exchangers or the like. There is no lower temperature limit as long as it does not go below the freezing point. The recycle stream is then fed to the eductor as motive water and mixed therein with the product stream from the reactor.

The process of the invention is particularly suitable for production of chlorine dioxide in small-scale, for example from about 0.5 to about 250 kg $ClO_2$/hr, preferably from about 10 to about 150 kg $ClO_2$/hr. Unlike other chlorate based processes operated without a separate absorption tower the process of the invention enables production of chlorine dioxide solutions of high concentration, for example from about 4 to about 10 grams/litre or more.

A typical small-scale production unit of the invention normally includes only one reactor, although it is possible to arrange several, for example up to about 15 or more reactors in parallel, for example as a bundle of tubes.

The invention further concerns a production unit for the production of an aqueous solution comprising chlorine dioxide, said unit comprising:
a) a reactor provided with one or more feed inlets for acid, hydrogen peroxide and alkali metal chlorate;
b) an eductor connected to the reactor and provided with an inlet for motive water and means for mixing a product stream from the reactor with motive water to obtain a diluted product stream;
c) means for removing oxygen from a diluted product stream obtained from the eductor;
d) means for withdrawing part of the diluted product stream;
e) means for adding water to the non-withdrawn part of the diluted product stream to obtain a recycle stream; and,
f) means for feeding the recycle stream as motive water to the eductor.

Regarding preferred features of the production unit the above description of the process is referred to.

An embodiment of the invention will now be described with reference to the enclosed drawing. The scope of the invention is, however, not limited to this embodiment.

The FIGURE schematically shows a process scheme of the invention.

Referring to the FIGURE, sulfuric acid and a pre-mixed aqueous solution of sodium chlorate and hydrogen peroxide are fed to a vertical through-flow tubular reactor 1 and reacted therein to form a product stream 2 of liquid and foam comprising chlorine dioxide, oxygen, sodium sulfate and some remaining sulfuric acid and sodium chlorate. An eductor 3 is supplied with motive water 4 and generates a slightly subatmospheric pressure bringing the product stream out from the reactor 1 into the eductor 3 where it is mixed with the motive water to form a diluted product stream 5, which is brought to a tank 6. A part of the diluted product stream is withdrawn from the tank by a pump 8 as a final product 9, i.e. an aqueous solution comprising chlorine dioxide. The tank 6 is provided with a fan 7 venting out oxygen that goes off from the diluted product stream therein. The non-withdrawn part of the diluted product solution is brought out from the tank 6 by the pump 10 and mixed with cold water 11, e.g. having a temperature from about 1 to about 20° C., preferably from about 4 to about 10° C., to form a recycle stream 12. The gas vented out from the tank 6 may also contain some chlorine dioxide and to minimize the losses thereof it is possible to scrub the gas with water to absorb most of the chlorine dioxide (not shown in the FIGURE) and return it to the diluted product stream or the recycle stream. The recycle stream 12 is returned to the eductor and fed thereto as motive water 4. In a process producing a 6 grams ClO$_2$/litre product solution 9 it may be suitable to add enough water to obtain a recycle stream 12 comprising from about 3 to about 4.5 grams ClO$_2$ per litre, depending on how efficient the eductor is. In order to produce a 10 grams ClO$_2$/litre product solution 9 it may be suitable to add enough water to obtain a recycle stream 12 comprising about 7 grams ClO$_2$ per litre.

The process equipment, including the reactor 1, the eductor 3 and the tank 6, are suitably made from materials resistant to the chemicals they are in contact with, such as one or more of hydrogen peroxide, sodium chlorate, sulfuric acid and chlorine dioxide. Such materials include, for example, glass, tantalum, titanium, fiberglass reinforced plastic, fluoro plastics like PVDF (polyvinylidene fluoride) CPVC (chlorinated polyvinyl chloride), PTFE (polytetrafluoro ethylene), PFA (perfluoro alkoxy polymer), ECTFE (ethylene chlorotrifluoro ethylene) or FEP (fluorinated ethylene propylene), or the use of these materials as a liner material to a structural material like steel or stainless steel. Suitable fluoro plastics are sold under the trademarks Kynar®, Teflon® or Halar®.

The invention will be further illustrated through the following example which, however, is not intended to limit the scope thereof. Unless otherwise stated, all parts and percentages refer to parts and percent by weight.

EXAMPLE

Chlorine dioxide was produced from sulfuric acid and a mixture of sodium chlorate and hydrogen peroxide in a plant as described in the FIGURE. One hour after start the following conditions were observed:

| | |
|---|---|
| Operating rate: | 45 kg/hr ClO$_2$ |
| Concentration of product solution (9): | 5.9 g/l ClO$_2$ |
| Flow of product solution (9): | 7 m$^3$/hr |
| Flow of recycle stream (12): | 26 m$^3$/hr |
| Flow of cold water (11): | 7.5 m$^3$/hr |
| Temperature of cold water (11): | 10° C. |
| Temperature in tank (6): | 14° C. |

The invention claimed is:

1. A process for the production of an aqueous solution comprising chlorine dioxide, said process comprising the steps of continuously:
    (a) feeding to a reactor an acid, hydrogen peroxide and alkali metal chlorate;
    (b) reacting the alkali metal chlorate with the acid and the hydrogen peroxide to form a product stream containing chlorine dioxide, oxygen and alkali metal salt of the acid;
    (c) bringing the product stream from the reactor to an eductor and mixing it with motive water fed to the eductor and thereby forming a diluted product stream;
    (d) removing oxygen from the diluted product stream;
    (e) withdrawing part of the diluted product stream, before, during or after the step of removing oxygen;
    (f) after the step of removing oxygen, adding water to the non-withdrawn part of the diluted product stream to form a recycle stream; and,
    (g) bringing the recycle stream to the eductor and feeding it thereto as motive water.

2. A process as claimed in claim 1, wherein the water added to form the recycle stream has a temperature sufficiently low to give a temperature of the recycle stream below about 20° C.

3. A process as claimed in claim 1, wherein the water added to form the recycle stream is added in an amount to give a concentration of chlorine dioxide in the recycle stream from about 2 grams/liter to about 12 grams/liter.

4. A process as claimed in claim 1, wherein the diluted product stream is brought to a vented tank where it is held at a time sufficient for at least some of the oxygen to go off.

5. A process as claimed in claim 4, wherein the part of the diluted product stream withdrawn in step (e) is withdrawn from the vented tank.

6. A process as claimed in claim 4, wherein the temperature in the vented tank is maintained from about 1 to about 20° C.

7. A process as claimed in claim 1, wherein from about 10 to about 90% of the diluted product stream is withdrawn in step (e).

8. A process as claimed in claim 1, wherein the diluted product stream contains more than 4 grams/liter of chlorine dioxide.

9. A process as claimed in claim 1, wherein the acid is sulfuric acid.

10. A process as claimed in claim 1, wherein the reactor is a through-flow vessel or a pipe.

11. A process as claimed in claim 1, wherein the acid, the alkali metal chlorate and the hydrogen peroxide are fed close to one end of the reactor while the product stream is withdrawn at the other end of the reactor.

12. A process for the production of an aqueous solution comprising chlorine dioxide, said process comprising the steps of continuously:
    (a) feeding to a reactor an acid, hydrogen peroxide and alkali metal chlorate;
    (b) reacting the alkali metal chlorate with the acid and the hydrogen peroxide to form a product stream containing chlorine dioxide, oxygen and alkali metal salt of the acid;
    (c) bringing the product stream from the reactor to an eductor and mixing it with motive water fed to the eductor and thereby forming a diluted product stream;
    (d) removing oxygen from the diluted product stream;
    (e) withdrawing part of the diluted product stream, before, during or after the step of removing oxygen;
    (f) after the step of removing oxygen, adding water to the non-withdrawn part of the diluted product stream to form a recycle stream with a concentration of chlorine dioxide from about 2 grams/liter to about 12 grams/liter and a temperature below about 20° C.; and, (g) bringing the recycle stream to the eductor and feeding it thereto as motive water.

13. A process as claimed in claim 12, wherein the diluted product stream is brought to a vented tank where it is held at a time sufficient for at least some of the oxygen to go off.

14. A process as claimed in claim 13, wherein the part of the diluted product stream withdrawn in step (e) is withdrawn from the vented tank.

15. A process as claimed in claim 13, wherein the temperature in the vented tank is maintained from about 1 to about 20° C.

16. A process as claimed in claim 12, wherein from about 10 to about 90% of the diluted product stream is withdrawn in step (e).

17. A process as claimed in claim 12, wherein the diluted product stream contains more than 4 grams/liter of chlorine dioxide.

18. A process as claimed in claim 12, wherein the acid is sulfuric acid.

19. A process as claimed in claim 12, wherein the reactor is a through-flow vessel or a pipe.

\* \* \* \* \*